(12) United States Patent
Chen et al.

(10) Patent No.: US 7,757,127 B2
(45) Date of Patent: Jul. 13, 2010

(54) DEVICE RETRY MECHANISMS FOR CONTENT DISTRIBUTION

(75) Inventors: An Mei Chen, San Diego, CA (US); Ravinder Paul Chandhok, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 415 days.

(21) Appl. No.: 11/612,986

(22) Filed: Dec. 19, 2006

(65) Prior Publication Data
US 2008/0046777 A1 Feb. 21, 2008

Related U.S. Application Data

(60) Provisional application No. 60/812,395, filed on Jun. 8, 2006.

(51) Int. Cl.
*G06F 11/00* (2006.01)
(52) U.S. Cl. ...................................................... 714/43
(58) Field of Classification Search ...................... 714/4, 714/18, 21, 37–39, 43, 47, 55
See application file for complete search history.

(56) References Cited

U.S. PATENT DOCUMENTS

| | | | |
|---|---|---|---|
| 6,704,885 B1 | 3/2004 | Salas-Meza et al. | |
| 7,277,446 B1 * | 10/2007 | Abi-Nassif et al. | 370/412 |
| 7,441,041 B2 | 10/2008 | Abi-Massif et al. | |
| 2002/0161913 A1 | 10/2002 | Gonzalez et al. | |
| 2002/0194289 A1 * | 12/2002 | Engel et al. | 709/208 |
| 2003/0126244 A1 | 7/2003 | Smith et al. | |
| 2005/0043037 A1 * | 2/2005 | Ioppe et al. | 455/456.1 |
| 2006/0159069 A1 * | 7/2006 | Parekh et al. | 370/352 |
| 2007/0006207 A1 * | 1/2007 | Appaji | 717/168 |
| 2007/0073820 A1 * | 3/2007 | Chandhok et al. | 709/206 |

FOREIGN PATENT DOCUMENTS

| | | |
|---|---|---|
| WO | 05117345 | 12/2005 |
| WO | 06099230 | 9/2006 |

OTHER PUBLICATIONS

International Search Report PCT/US2007/070659 International Search Authority European Patent Office, Jan. 8, 2008.
Written Opinion PCT/US07/070659 International Search Authority European Patent Office Dec. 8, 2008.

* cited by examiner

*Primary Examiner*—Nadeem Iqbal
(74) *Attorney, Agent, or Firm*—Gerald P. Joyce, III (57) ABSTRACT

A system and method are provided for enabling a user device to retry a unicast transaction with a server. The user device includes a unicast retry module having both an inner loop retry module and an outer loop retry module. The inner loop retry module handles common transient error while the outer loop retry module allows additional retries after all inner loop retries have been exhausted for device-initiated transactions.

34 Claims, 8 Drawing Sheets

DEVICE RETRY MECHANISMS FOR CONTENT DISTRIBUTION

CLAIM OF PRIORITY UNDER 35 U.S.C. §119

The present Application for Patent claims priority to Provisional Application No. 60/812,395 entitled "DEVICE RETRY MECHANISMS FOR UNICAST TRANSACTIONs" filed Jun. 8, 2006, and assigned to the assignee hereof and hereby expressly incorporated by reference herein.

BACKGROUND

1. Field

The present disclosure relates generally to communications systems, and more specifically to systems and methods for device retry mechanisms for content distribution in multicast and unicast systems.

2. Background

The distribution of services to a large number of devices is a complicated problem. This is particularly true for mobile devices, which may have limited resources, such as limited memory or limited battery power. Oftentimes, communication between mobile devices and servers responsible for the distribution of services fail. For example, the server may be unavailable, or there may be network errors prohibiting successful communication between the server and the mobile device.

There is therefore a need in the art for a mechanism that enables mobile devices to retry failed communication attempts with the server. Additionally, there is a need for a device able to effectively distribute the load on a network.

SUMMARY

In one aspect of the present invention, a method is provided for contacting a server within a specified time window, comprising receiving notification from the server indicating the time window, the time window characterized by a start time and an end time, choosing a guard time located within the time window, determining a number of outer-loop contact attempts allowed for contacting the server, contacting the server at a first random time instance within the time window, and contacting the server at one or more subsequent time instances until the number of outer-loop contact attempts is reached if the first attempt fails.

In another aspect, a device is provided for receiving content over a wireless network comprising a receiver configured to receive a notification message from a server indicating the availability of one or more services, the notification message including a time window indicating the time period in which the receiver can obtain one or more services, and a control processor configured to determine a first time instance within the time window in which to contact the server to receive one or more services, wherein the control processor is further configured to reattempt the contact if it is determined that the initial contact failed.

DETAILED DESCRIPTION

The detailed description set forth below in connection with the appended drawings is intended as a description of various configurations of the invention and is not intended to represent the only configurations in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

The concepts and techniques described herein may be used in various unicast and multicast systems that deliver content to subscribers over a wired and wireless medium. Examples of wired media include Ethernet systems, Digital Subscriber Lines (DSL), cable modem, fiber optics, standard telephone lines, and others. Examples of wireless media include cellular systems, broadcast systems, wireless local area network (WLAN) systems, and others. The cellular systems may be Code Division Multiple Access (CDMA) systems, Time Division Multiple Access (TDMA) systems, Frequency Division Multiple Access (FDMA) systems, Orthogonal Frequency Division Multiple Access (OFDMA) systems, Single-Carrier FDMA (SC-FDMA) systems, and other multiple access systems. The broadcast systems maybe MediaFLO systems, Digital Video Broadcasting for Handhelds (DVB-H) systems, Integrated Services Digital Broadcasting for Terrestrial Television Broadcasting (ISDB-T) systems, and other broadcast systems. The WLAN systems may be IEEE 802.11 systems, Wi-Fi systems, and others. These systems are known in the art.

The concepts and techniques described herein are well suited for wireless systems with a single subcarrier as well as systems with multiple subcarriers. Multiple subcarriers may he obtained with OFDM, SC-FDMA, or some other modulation technique. OFDM and SC-FDMA partition a frequency band (e.g., the system bandwidth) into multiple orthogonal subcarriers, which are also called tones, bins, etc. Each subcarrier may be modulated with data. In general, modulation symbols are sent on the subcarriers in the frequency domain with OFDM and in the time domain with SC-FDMA. OFDM is used in various systems such as MediaFLO, DVB-H and ISDB-T broadcast systems, IEEE 802.11a/g WLAN systems, and some cellular systems. Certain aspects and configurations are described below for a unicast system that uses OFDM, e.g., a MediaFLO system.

Figure 1:
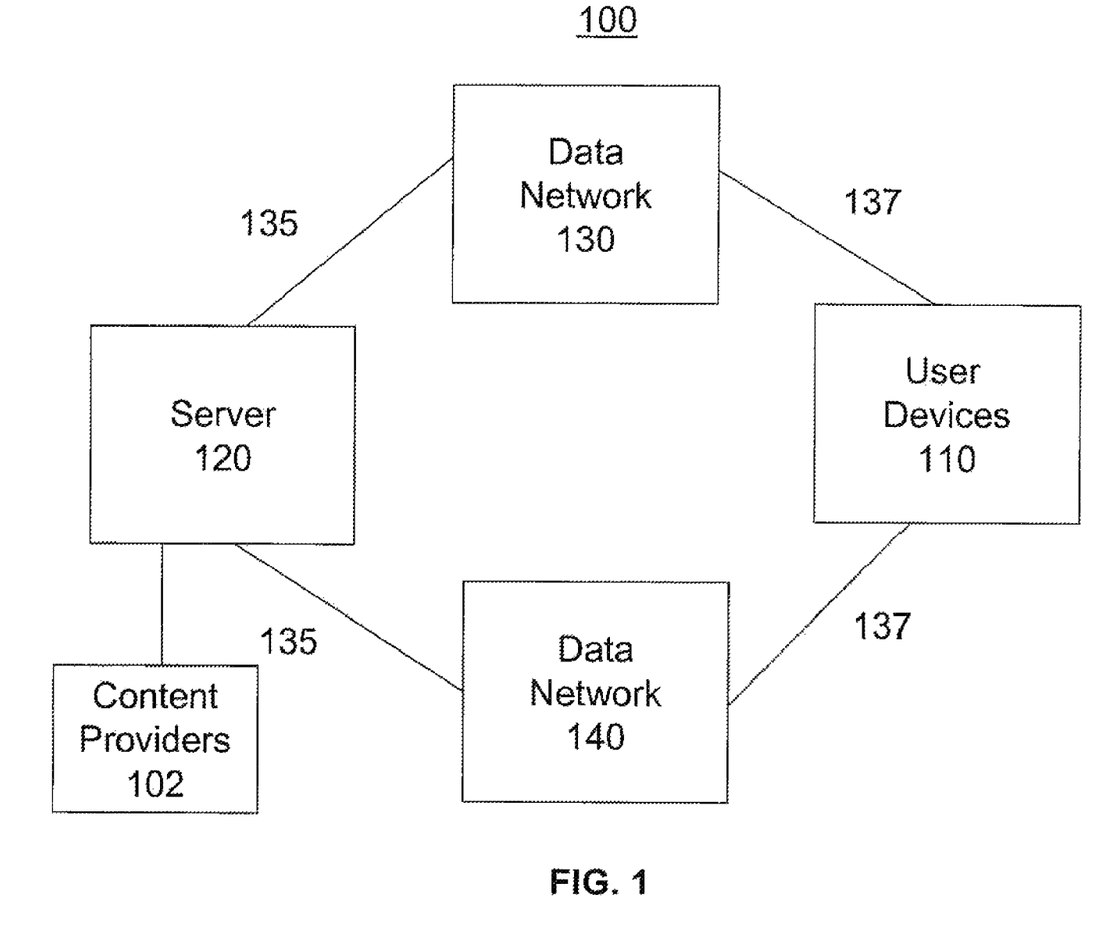
FIG. 1 is a conceptual block diagram of a communications network.

A system and method are described herein for reattempting unicast transactions between a user device and a server in the event of a failure. However, those skilled in the art will readily appreciate that the various concepts described throughout this disclosure may be extended to multicast and other communication systems. FIG. 1 depicts a conceptual block diagram of a communications network 100. One or more content providers 102 operate to provide the content for distribution to subscribers through a server 120. In this example, the content may include media, such as video, audio, multimedia content, clips, scripts, programs, data and any other suitable content. The media may comprise real-time content, non-real-time content, and/or a combination of the two. Additionally, server 120 may be configured to manage user-service subscriptions, delivery of access and encryption keys, and to provide billing information.

The communications network shown in FIG. 1 is shown with two data networks 130, 140. The data networks 130, 140 may be any type of suitable networks capable of delivering content, or providing other services, to subscribers. By way of example, data network 130 may network of transmitters the distribute content from server 120 through a geographic region. In this example, network 140 may be a cellular network that delivers content to subscribers when they are outside the geographic coverage region of data network 130. Alternatively, or in addition to, data network 140 may be used to transport unicast messages between server 120 and subscribers enabling them to activate their devices, subscribe to services, download service license keys, upload usage tracking reports, and/or other interactive services.

A subscriber, in this configuration, receives content on a wireless user device 110. The user device 110 may also be called an access terminal, handset, wireless subscriber, wireless unit, wireless device, wireless communications device, wireless telecommunications device, wireless telephone, cellular telephone, user terminal, user equipment, mobile station, mobile unit, subscriber station, wireless station, mobile radio, radio telephone, or some other terminology. The user device 110 may be a mobile telephone, a personal digital assistant (PDA), a personal or laptop computer, or other device capable of receiving unicast data.

Figure 2:
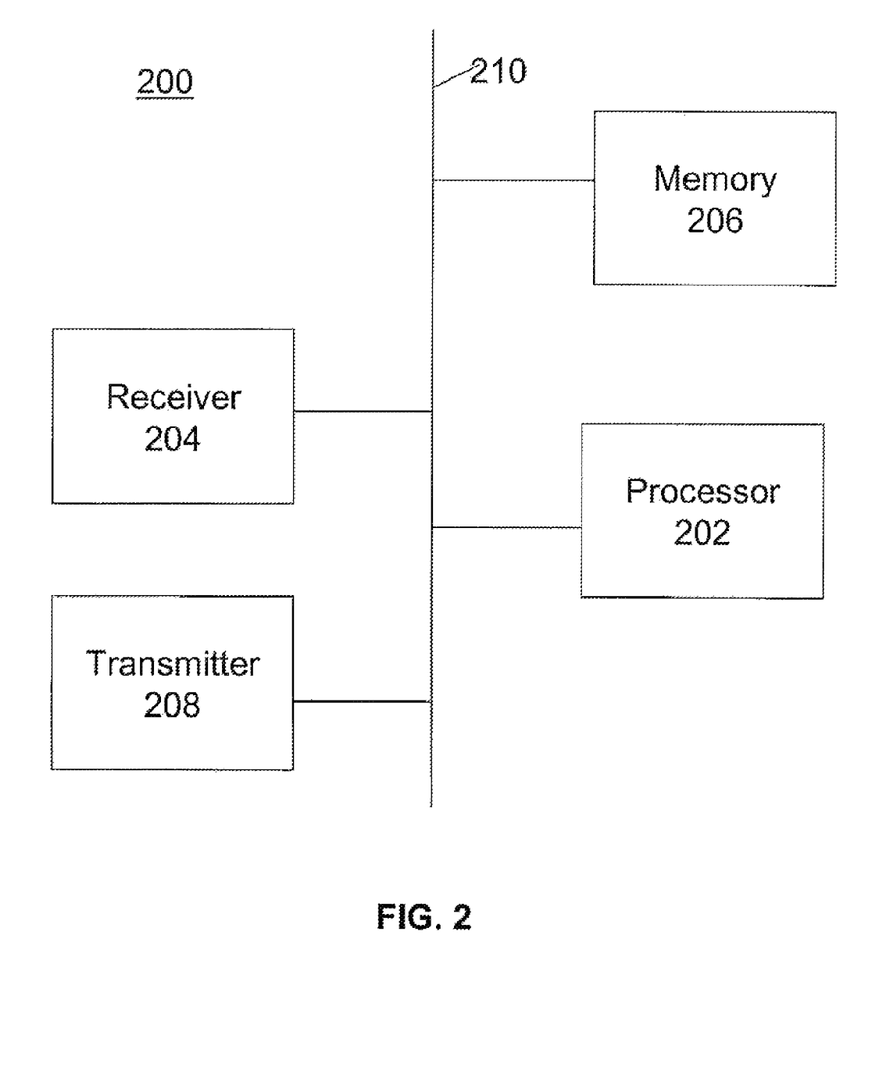
FIG. 2 is a block diagram of a user device.

FIG. 2 is a block diagram depicting a user device 200 suitable for use in one or more configurations. User device 200 comprises a processor 202, a receiver 204, memory 206, and a transmitter 208, all coupled to a data bus 210. These components are configured to enable user device 200 to communicate with a server to receive content and exchange other types of data.

Receiver 204 and transmitter 208 may comprise hardware and/or software that operate to allow user device 200 to transmit and receive content data and/or other information with external devices or systems via a communications channel. In a user device 200 configured to support an OFDM interface with one or both the data networks 130, 140 (see FIG. 1), the receiver 204 receives a carrier signal modulated with encoded OFDM symbols. The receiver 204 processes the modulated signal (e.g., filters, amplifies, and frequency downconverts) to recover the OFDM symbols, performs OFDM demodulation to produce data symbol estimates, and processes (e.g., symbol demaps, deinterleaves, and decodes) the data symbol estimates to recover the content.

Processor 202 may be used to control and manage the operation of the user device 200, as well as provide an interface to the user. Processor 202 may comprise a CPU, processor, gate array, hardware logic, memory elements, virtual machine, software, and/or any combination of hardware and software. Generally, processor 202 may be configured to execute machine-readable instructions and to control one or more other functional elements of user device 200. Memory 206 comprises any type of memory suitable for storing information at user device 200. For example, user device 200 may operate to download content and store the received content in memory 206 for further processing. The manner in which processor 202 is implemented will depend on the particular application and the design constraints imposed on the overall system. Those skilled in the art will recognize the interchangeability of hardware, firmware, and software configurations under these circumstances, and how best to implement the described functionality for each particular application.

In addition to receiving content, user device 200 performs several unicast transactions. These unicast transactions may be categorized as user-initiated transactions or device-initiated transactions. Device-initiated transactions include requests made by the device independently based on the device state or commands received from a server. User-initiated transactions include those transactions wherein a user directs the device to perform a specified action, for example, by selecting a particular menu option or otherwise entering a command. User-initiated transactions may include device activation and subscriptions, while device-initiated transactions may include service key license download requests and usage tracking log uploads. Other unicast transactions may also be performed. In one configuration, a unicast retry module 300, depicted in FIG. 3, may be used to enable user device 200 to retry a failed transaction.

Figure 3:
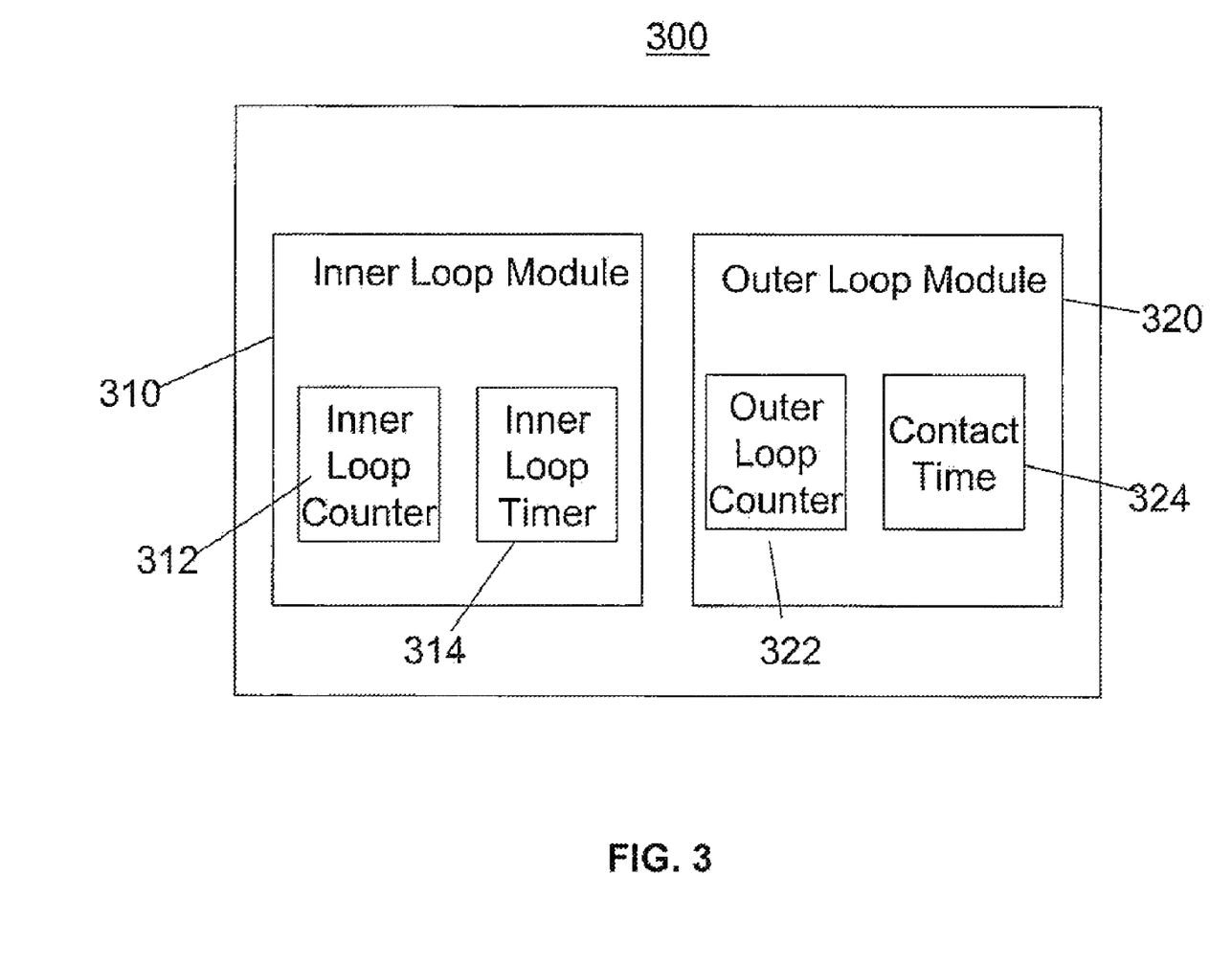
FIG. 3 is a conceptual block diagram of a unicast retry module.

Unicast retry module 300 is intended to refer to a processing-related entity, either hardware, a combination of hardware and software, software, or software in execution. For example, unicast retry module 300 may be, but is not limited to, a process running on a processor, a processor, an object, a thread of execution, and/or a program. In user device 200 (see FIG. 2), unicast retry module 300 may be a separate component, distributed between multiple components, or integrated into one or more components. In one configuration, unicast retry module 300 is implemented by processor 202 described above in connection with FIG. 2.

Returning to FIG. 3, unicast retry module 300 may include an inner loop retry module 310 and an outer loop retry module 320. Inner loop retry module 310 may be configured to handle common transient failures such as, for example, a server being busy, a signal fading, or other transient errors for both user and device initiated transactions. Outer loop retry module 320 may be configured to allow additional retries after all inner-loop retries have been exhausted for device-initiated transactions.

According to some configurations, inner loop retry module 310 may include inner loop counter 312 and inner loop timer 314. Inner loop counter 312 may be configured to allow a device-configurable number of attempts to complete a transaction with the server. Inner loop counter 312 is adjusted after each transaction failure. Thus, in the event of a transient error, additional attempts at completing the transaction may be attempted prior to aborting the transaction. The user need only be informed of the failure after all attempts have been exhausted. Additionally, inner loop retry module 310 may include inner loop timer 314. A timeout value may be defined for each contact transaction. If the timer's timeout value expires, this indicates that the transaction attempt has failed. In order to provide a time period in which to recover from any errors causing the transaction to fail, the device may wait a configurable retransmission waiting period before reattempting the transaction.

Figure 4:
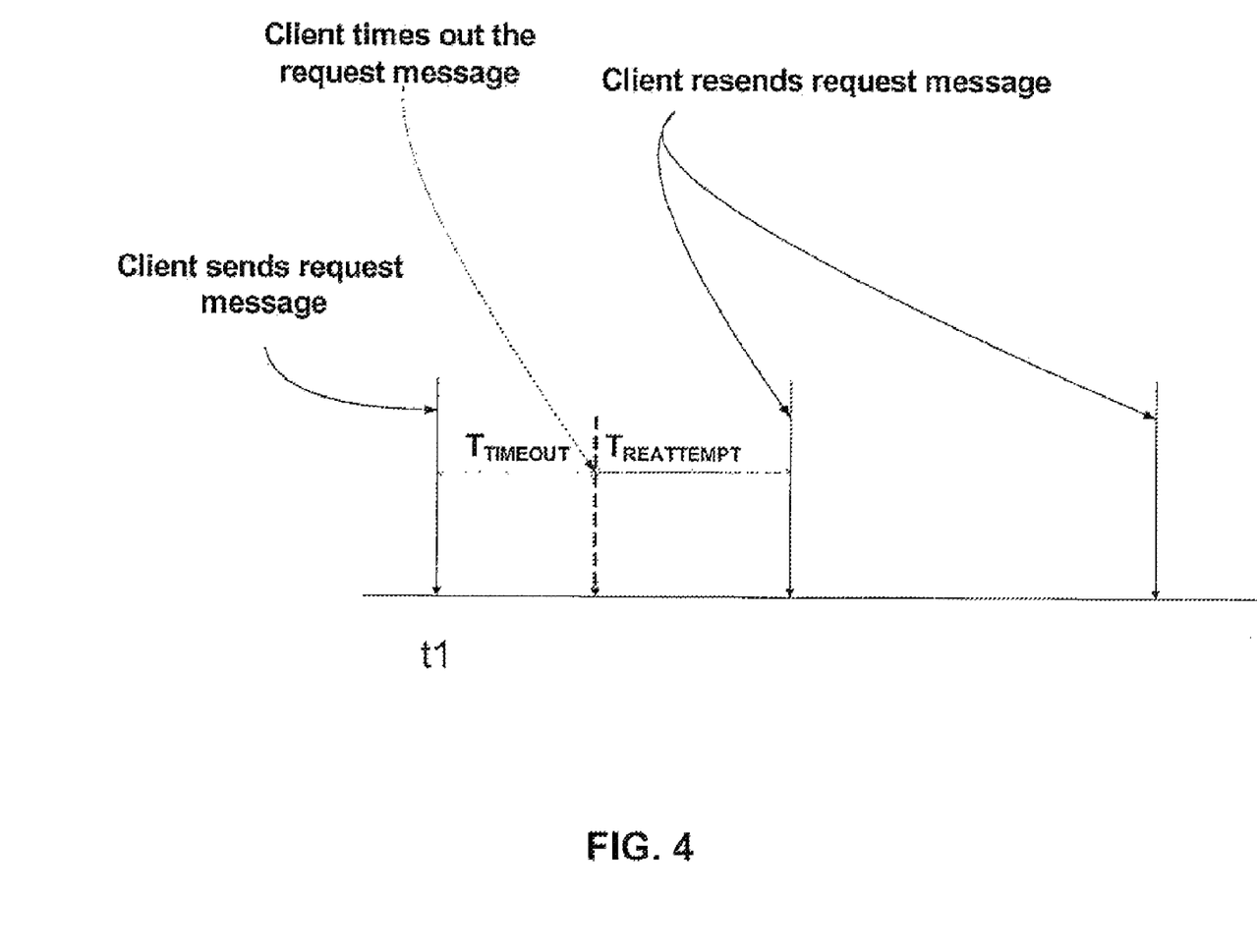
FIG. 4 is a graphical depiction of an inner loop retry module.

FIG. 4 provides a graphical depiction of an operation of an inner loop retry module, in accordance with one configuration. As depicted at time $t_1$, a client device sends a request message. For example, the client may submit an activation request or a request to subscribe to one or more services. Upon transmitting the request message, the client device waits a configurable time period $T_{timeout}$ to receive a response from the server. If no response is received before $T_{timeout}$, the client device waits for a configurable period $T_{Reattempt}$ prior to transmitting a second request transaction. The device continues to transmit request transactions until the transaction is successful or until the defined number of reattempts has been reached. If the transaction is not completed successfully, the device may provide a message to the user indicating the failure. The user may initiate the transaction again at a later time.

Device-initiated transactions may be initiated by the device in response to reserving a notification message from a server. For example, the server may provide a notification indicating that a new license key is available or requesting that the user upload its usage tracking log. The notification message may directly or indirectly specify a time window during which the device should contact the server to receive or submit the designated information. The time window may be used to uniformly distribute requests made by client devices, alleviating server and network overload problems.

Because no user action is required to initiate a device-initiated transaction, outer loop retry module 320 is provided to enable a configurable number of outer loop retry attempts, in addition to the inner loop attempts. As depicted in FIG. 3, outer loop retry module 320 may include outer loop counter 322 and contact time determination unit 324. Outer loop counter 322 is configured to track a configurable number of outer loop reattempts. During each outer loop reattempt, the client may perform a configurable number of inner loop retries for transient failures. Contact time determination unit 324 may be configured to determine the one or more times within the time window wherein the device will attempt to contact the server.

Figure 5:
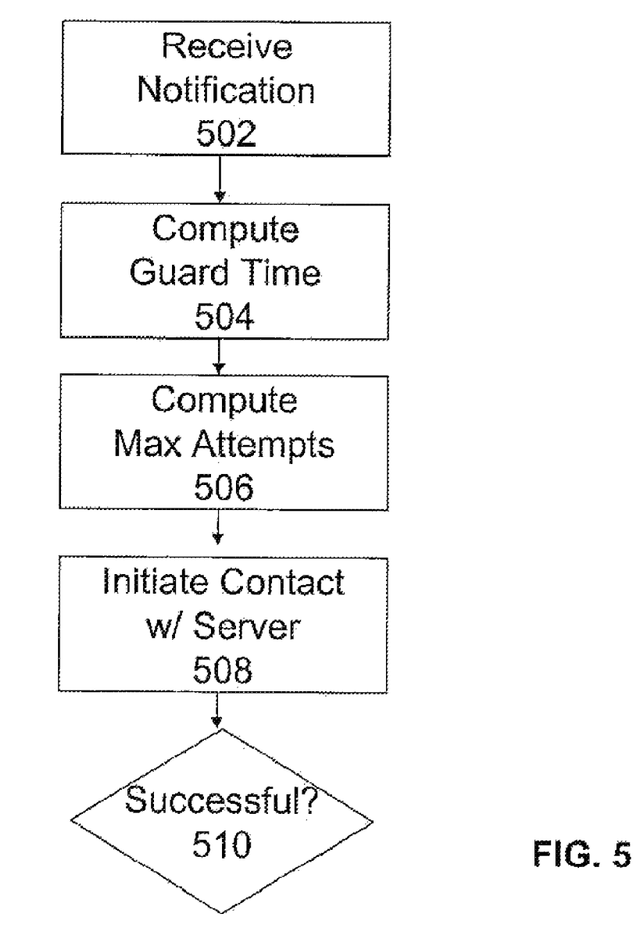
FIG. 5 is a flowchart depicting the operation of a device retry mechanism.

FIG. 5 is a flowchart illustrating an operation of a user device performing a device-initiated transaction, according to one configuration. As depicted at 502, the device receives a notification message. This notification message may be, for example, a usage tracking notification, a service alert, a client application upgrade notification, a service key epoch notification and/or other notifications. The notification provides a time window during which the user device needs to contact the server.

The time window may be defined by two parameters $TW_{Start}$ and $TW_{End}$, wherein $TW_{Start}$ defines the earliest time at which a device may attempt to initiate a unicast transaction with the server and $TW_{End}$ defines the latest time at which the device may attempt to initiate a unicast transaction. According to some configurations, if the device is unable to send or receive the necessary information before the time $TW_{End}$, the transaction is abandoned.

The parameters $TW_{Start}$ and $TW_{End}$ may be defined based, at least in part, on the type of operation to be performed. For example, if the operation to be performed is a service key license download, $TW_{Start}$ may be defined as the time when the network broadcasts the new service key epoch, which $TW_{End}$ may be the time when the new service key epoch starts. For usage tracking upload notifications, the parameters may be specified as a part of the notification message.

Upon receipt of a notification message, the device may compute a guard time $TW_{Gaurd}$, as depicted at 504. The guard time is a time instance between the start of the time window and the end of the time window. It is computed such that even a device whose first attempt to contact the server is delayed considerably has an opportunity for a reasonable number of retries in the event of a failure on its first attempt.

The number of attempts a device is allowed to contact the server in case of a failure is a configurable parameter which may be based in part on how close to the end of the time window the device receives the notification to contact the server. As depicted at 506, the device computes a maximum number of attempts allowed for contacting the server in response to the notification. This may include determining a maximum number of inner loop attempts and a maximum number of outer loop attempts. According to some configurations, the maximum number of outer loop attempts allowed may depend on the when the notification is received by the device. As such, the device may compute a maximum number of transmission attempts for the case where the notification is received before the guard interval and a maximum number of transmission attempts for the case where the notification is received at or after the guard interval. Calculation of these values is described in further detail hereinafter.

Once the device has determined the number of attempts allowed for contacting the server, the device may initiate a contact, as depicted at 508. At step 510, the device determines whether the contact attempt was successful. Failure may be indicated, for example, by receipt of a notification from the Common Messaging Protocol declaring a transient failure, expiration of a preset timeout value, and/or other failure indicators. If the contact attempt is not successful, subsequent attempts are made until the maximum number of attempts has been reached or the time window ends.

Figure 6:
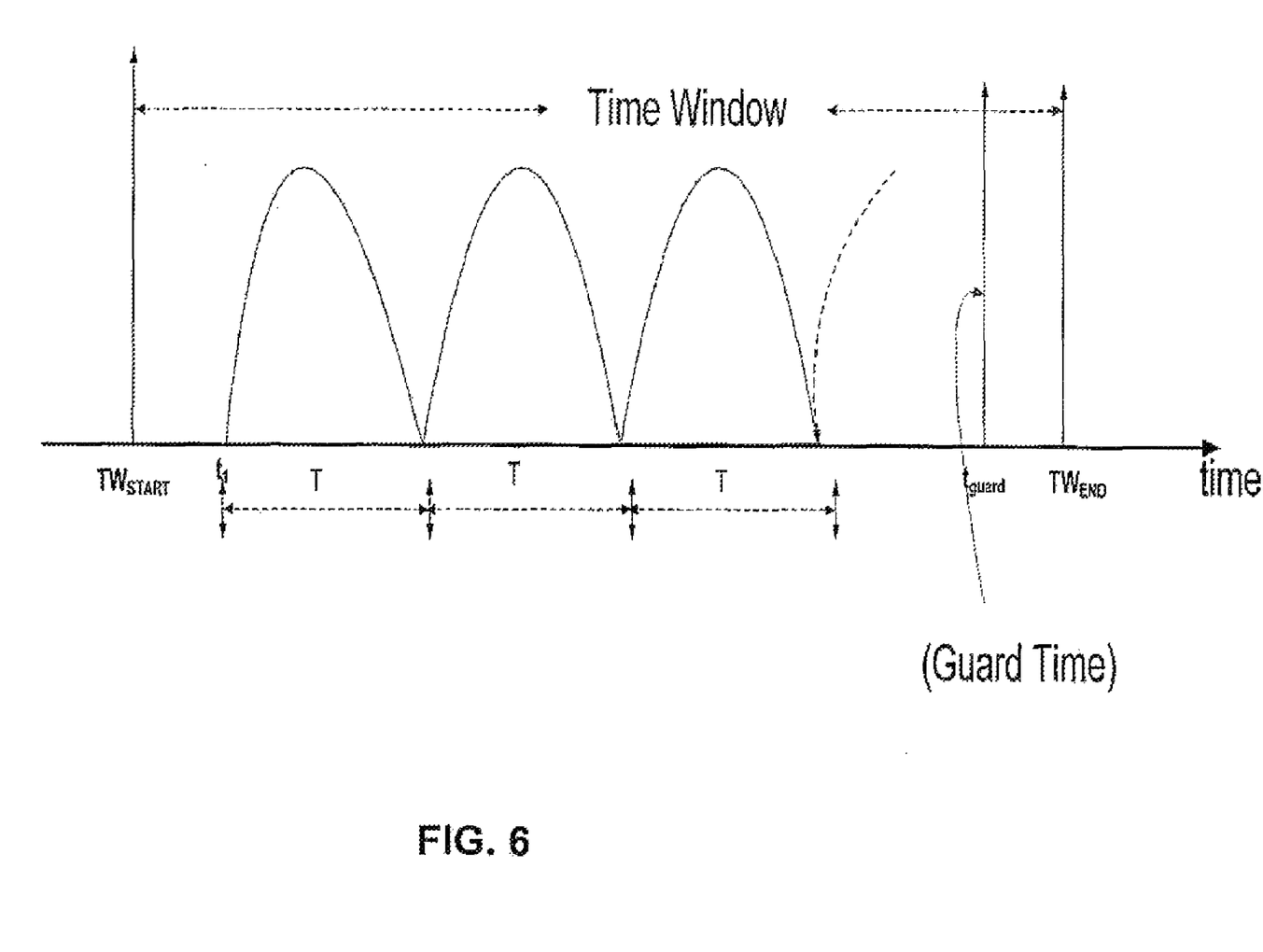
FIG. 6 is a graphical depiction of a retry mechanism.

The time at which a client device receives a notification of the time window may vary based on, for example, the device capabilities, the connection between the device and the server, and/or other variances. FIG. 6 depicts the operation of a retry calculation mechanism wherein the time window notification is received before the guard time.

When a client device receives a time window notification, the client device may choose a time $t_1$ for performing a first outer loop attempt as a random time instance between $TW_{Start}$ and $TW_{Gaurd}$. If the first outer loop attempt fails, the remaining duration of the time window may be divided into a plurality of time slices of equal duration. The plurality of time slices may be defined as the number of outer loop attempts available for the device.

For the next outer loop reattempt, the client device chooses the next earliest time slices and selects a random instance within the chosen time slice. The transaction may be attempted for the predetermined number of outer loop attempts. While not depicted in FIG. 6, one or more inner loop reattempts may be made within an outer loop time slice. Thus, if transient errors occur during an outer loop attempt, the device may automatically retry the operation within a time slice based on a defined number of allowable inner loop attempts.

Figure 7:
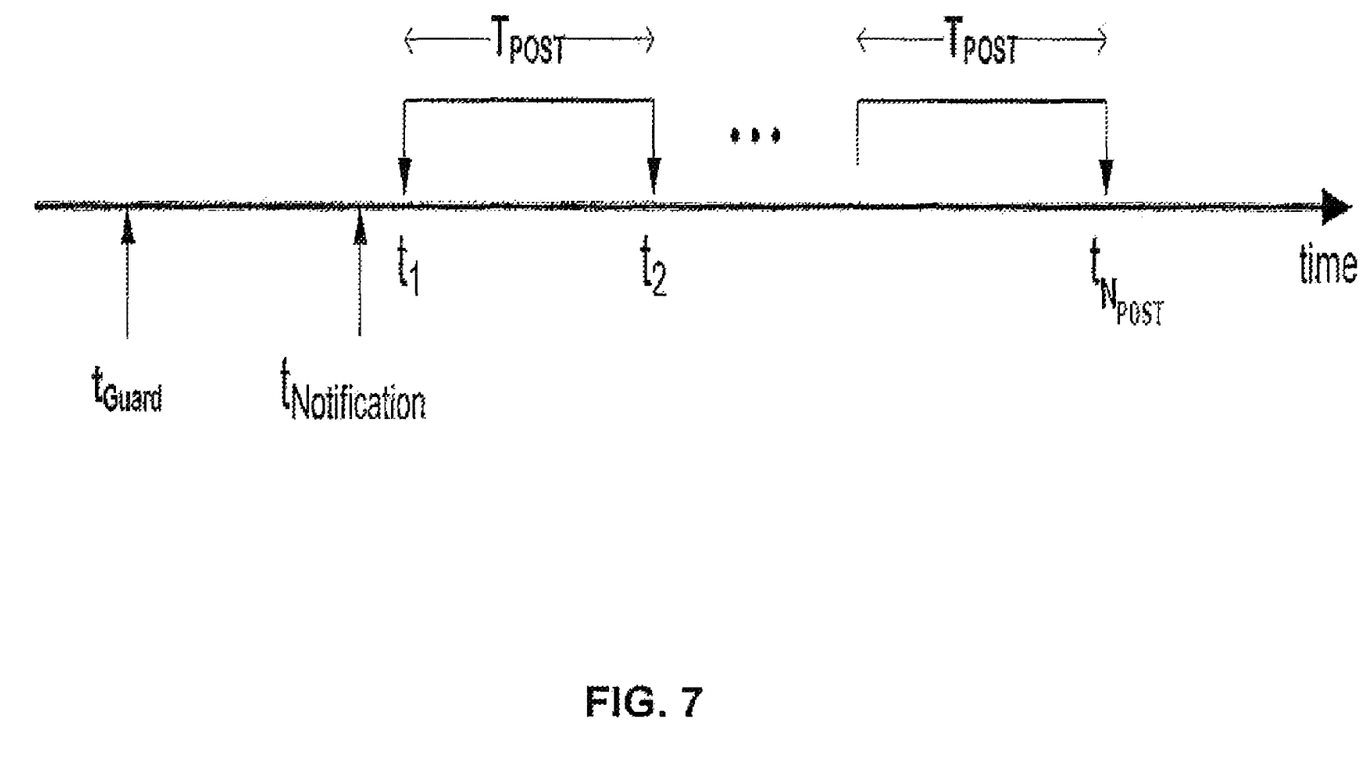
FIG. 7 is another graphical depiction of a retry mechanism.

According to some configurations, the client device may receive the notification message at or after the guard time. FIG. 7 depicts the operation of a unicast retry mechanism wherein the notification is received at or after the guard time. The device is still allowed sufficient time for retries in the event of a failure, even though the first attempt occurs late in the time window.

As depicted in FIG. 7, the first attempted unicast transaction occurs as soon as possible after receiving the notification $T_{Notification}$. This is depicted at time $t_1$. If the first attempt fails, the device may wait a configurable time interval $T_{Post}$ before making a subsequent attempt. If the current attempt fails, the device continues to make subsequent attempts until a predefined maximum number of attempts $N_{Post}$ is reached. If the device is unable to successfully reach the server before the end of the time window, the device may abandon further attempts, even if the maximum number of attempts has not been reached.

Figure 8:
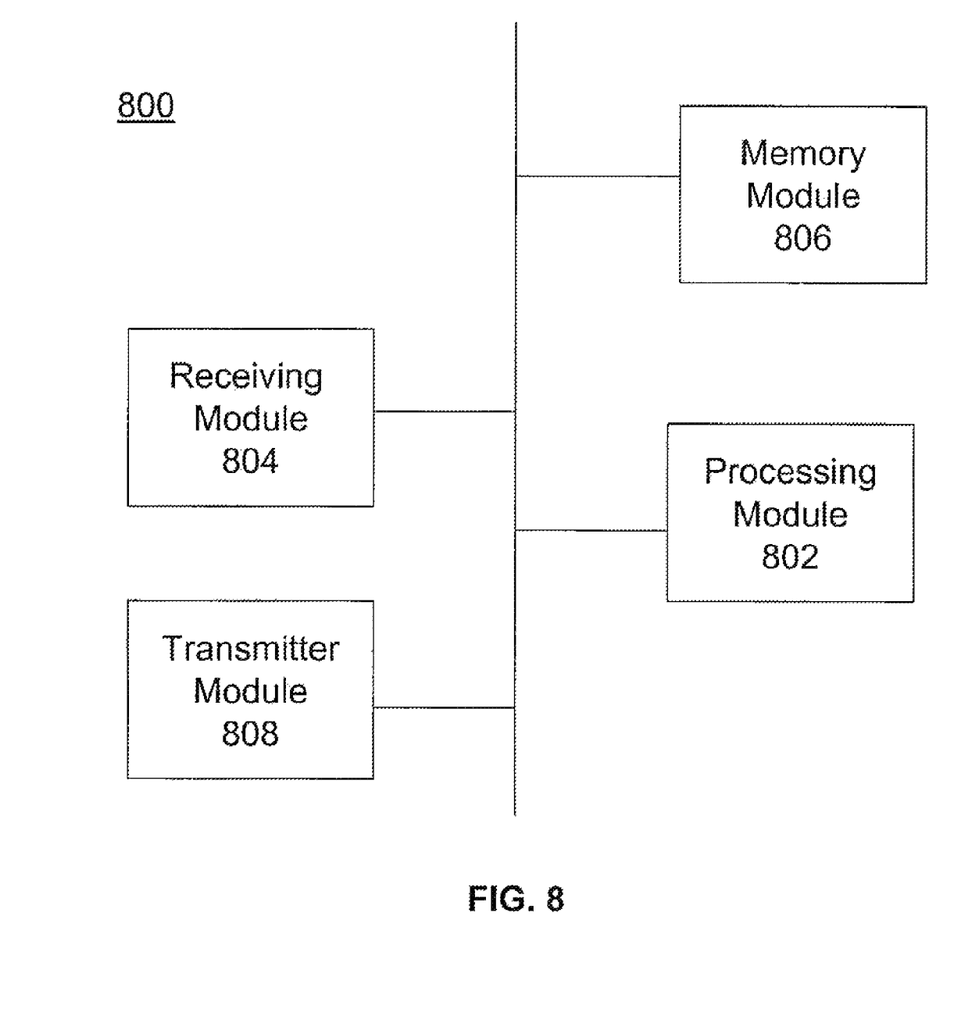
FIG. 8 is a block diagram depicting a user device 800 suitable for use in one or more configurations.

FIG. 8 is a block diagram depicting a user device 800 suitable for use in one or more configurations. User device 800 comprises module for processing 802, module for receiving 804, memory module 806, and module for transmitting 808, all coupled to a data bus 810. These components are configured to enable user device 800 to communicate with a server to receive content and exchange other types of data.

Module for receiving 804 and module for transmitting 808 may comprise hardware and/or software that operate to allow user device 800 to transmit and receive content data and/or other information with external devices or systems via a communications channel. In a user device 800 configured to support an OFDM interface with one or both the data networks 130, 140 (see FIG. 1), the module for receiving 804 receives a carrier signal modulated with encoded OFDM symbols. The module for receiving 804 processes the modulated signal (e.g., filters, amplifies, and frequency downconverts) to recover the OFDM symbols, performs OFDM demodulation to produce data symbol estimates, and processes (e.g., symbol demaps, deinterleaves, and decodes) the data symbol estimates to recover the content.

Module for processing 802 may be used to control and manage the operation of the user device 200, as well as provide an interface to the user. Module for processing 802 may comprise a CPU, processor, gate array, hardware logic, memory elements, virtual machine, software, and/or any combination of hardware and software. Generally, module for processing 802 may be configured to execute machine-readable instructions and to control one or more other functional elements of user device 800. Memory module 806 comprises any type of memory suitable for storing information at user device 800. For example, user device 800 may operate to download content and store the received content in memory modules 806 for further processing. The manner in which module for processing 802 is implemented will depend on the particular application and the design constraints imposed on the overall system. Those skilled in the art will recognize the interchangeability of hardware, firmware, and software configurations under these circumstances, and how best to implement the described functionality for each particular application.

The previous description of the disclosed configurations is provided to enable any person skilled in the art to make or use the present invention. Various modifications to these configurations will be readily apparent to those skilled in the art, and the generic principles defined herein may be applied to other configurations without departing from the spirit or scope of the invention. Thus, the present invention is not intended to be limited to the configurations shown herein, but is to be accorded the full scope consistent with the claims, wherein reference to an element in the singular is not intended to mean "one and only one" unless specifically so state, but rather "one or more." All structural and functional equivalents to the elements of the various configurations described throughout this disclosure that or known of later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for contacting a server within a specified time window, comprising:
   receiving notification from the server indicating the time window, the time window characterized by a start time and an end time;
   choosing a guard time located within the time window;
   determining a number of outer-loop contact attempts allowed for contacting the server;
   contacting the server at a first random time instance within the time window; and
   contacting the server at one or more subsequent time instances until the number of outer-loop contact attempts is reached if the first attempt fails.

2. The method of claim 1, wherein the first random time period is a time period between the start time and the guard time.

3. The method of claim 1, wherein the number of outer loop attempts is determined based, at least in part, on the time at which the notification is received.

4. The method of claim 1, wherein if the first attempt fails, contacting the server at one or more subsequent instances comprises:
   dividing the time remaining in the time window into a plurality of time slices of equal duration; and
   issuing each subsequent attempt within the earliest time slice,
   wherein, the number of time slices is equal to the remaining number of outer loop attempts.

5. The method of claim 1, further comprising:
   determining a number of inner loop reattempts allowed within an outer loop attempt; and
   performing the determined number of inner loop reattempts if a transient error occurs.

6. The method of claim 5, wherein a reattempt waiting period is defined and implemented after each inner loop attempt.

7. The method of claim 1, wherein the duration of each time slice is equal to or greater than the maximum amount of time needed to declare a transient error.

8. The method of claim 1, wherein if the notification is received after the guard time, the first contact attempt is made immediately upon receipt of the notification.

9. The method of claim 8, wherein if the first contact attempt fails, one or more subsequent contact attempts are made at predetermined time intervals apart until the transaction succeeds or the time window ends, whichever occurs earlier.

10. A device for receiving content over a wireless network, comprising:
   a receiver configured to receive a notification message from a server indicating the availability of one or more services, the notification message including a time window indicating the time period during which the receiver can obtain the one or more services; and
   a control processor configured to determine a first time instance within the time window in which to contact the server to receive the one or more services,
   wherein the control processor is further configured to reattempt the contact if it is determined that the initial contact failed.

11. The device of claim 10, wherein the control processor comprises logic configured to select a guard time located within the time window, and wherein the first time instance is a time instance between the start of the time window and the guard time.

12. The device of claim 10, wherein the control processor is configured to determine a number of outer-loop contact attempts allowed for contacting the server based, at least in part, on the time at which the notification is received.

13. A processor configured to retry a failed communication transaction between a client device and a content server comprising:
   an inner loop retry module configured to handle common transient failures; and an outer loop retry module configured to allow additional retries after all inner-loop retries have been exhausted, wherein the number of outer loop attempts is determined based, at least in part, on the time at which a notification indicating a time window for contacting the content server is received.

14. The processor of claim 13, wherein the inner loop retry module further comprises:

an inner loop-counter configured to allow a predetermined number of attempts to complete a transaction with the content server; and an inner loop timer configured to specify a timeout value indicating that the transaction has failed.

15. The processor of claim 13, wherein the outer loop retry module further comprises:

an outer loop counter configured to track a predetermined number of outer loop attempts to complete a transaction with the content server; and a contact time determination module configured to determine one or more time periods within the time window wherein the device will attempt to contact the server.

16. The processor of claim 13, wherein the contact determination module is further configured to select a guard time between the start of the time window and the end of the time window, wherein a first of the one or more time periods is before the guard time.

17. A device for receiving content from a content server, the device capable of retrying a failed transaction, comprising:

means for receiving notification from the content server indicating a time window for receiving the content, the time window characterized by a start time and an end time;

means for choosing a guard time located within the time window;

means for determining a number of outer-loop contact attempts allowed for contacting the content server;

means for contacting the server at a first random time instance within the time window; and means for contacting the server at one or more subsequent time instances until the number of outer-loop contact attempts is reached if the first attempt fails.

18. The device of claim 17, wherein the first random time period is a time period between the start time and the guard time.

19. The device of claim 17, wherein the number of outer bop attempts is determined based, at least in part, on the time at which the notification is received.

20. The device of claim 17, wherein if the first attempt fails, means for contacting the server at one or more subsequent instances comprises:

means for dividing the time remaining in the time window into a plurality of time slices of equal duration; and means for issuing each subsequent attempt within the earliest time slice, wherein, the number of time slices is equal to the remaining number of outer loop attempts.

21. The device of claim 17, further comprising:

means for determining a number of inner loop reattempts allowed within an outer loop attempt; and means for performing the determined number of inner loop reattempts if a transient error occurs.

22. The device of claim 21, wherein a reattempt waiting period is defined and implemented after each inner loop attempt.

23. The device of claim 17, wherein the duration of each time slice is equal to or greater than the maximum amount of time needed to declare a transient error.

24. The device of claim 17, wherein if the notification is received after the guard time, the first contact attempt is made immediately upon receipt of the notification.

25. The device of claim 24, wherein if the first contact attempt fails, one or more subsequent contact attempts are made at predetermined time intervals apart until the transaction succeeds or the time window ends, whichever occurs earlier.

26. A computer readable storage medium embodying a program of instructions executable by a computer to perform a method of contacting a server within a specified time window, the method comprising:

receiving notification from the server indicating the time window, the time window characterized by a start time and an end time;

choosing a guard time located within the time window;

determining a number of outer-loop contact attempts allowed for contacting the server;

contacting the server at a first random time instance within the time window; and contacting the sewer at one or more subsequent time instances until the number of outer-loop contact attempts is reached if the first attempt fails.

27. The computer readable medium of claim 26, wherein the first random time period is a time period between the start time and the guard time.

28. The computer readable medium of claim 26, wherein the number of outer loop attempts is determined based, at least in part, on the time at which the notification is received.

29. The computer readable medium of claim 26, wherein if the first attempt fails, contacting the server at one or more subsequent instances comprises:

dividing the time remaining in the time window into a plurality of time slices of equal duration; and issuing each subsequent attempt within the earliest time slice, wherein, the number of time slices is equal to the remaining number of outer loop attempts.

30. The computer readable medium of claim 26, further comprising:

determining a number of inner loop reattempts allowed within an outer loop attempt; and performing the determined number of inner loop reattempts if a transient error occurs.

31. The computer readable medium of claim 30, wherein a reattempt waiting period is defined and implemented after each inner loop attempt.

32. The computer readable medium of claim 26, wherein the duration of each time slice is equal to or greater than the maximum amount of time needed to declare a transient error.

33. The computer readable medium of claim 26, wherein if the notification is received after the guard time, the first contact attempt is made immediately upon receipt of the notification.

34. The computer readable medium of claim 33, wherein if the first contact attempt fails, one or more subsequent contact attempts are made at predetermined time intervals apart until the transaction succeeds or the time window ends, whichever occurs earlier.

* * * * *